(12) United States Patent
Aronsson

(10) Patent No.: US 7,127,494 B1
(45) Date of Patent: Oct. 24, 2006

(54) INFORMATION DELIVERY SYSTEM, METHOD FOR INFORMATION DELIVERY, SERVICE PRODUCT AND USE OF THE SERVICE PRODUCT

(75) Inventor: Hannu Aronsson, Helsinki (FI)

(73) Assignee: Portalify Oy, Espoo (FI)

( * ) Notice: Subject to any disclaimer, the term of this patent is extended or adjusted under 35 U.S.C. 154(b) by 635 days.

(21) Appl. No.: 09/744,868

(22) PCT Filed: Nov. 29, 2000

(86) PCT No.: PCT/FI00/01035

§ 371 (c)(1),
(2), (4) Date: Jan. 29, 2001

(87) PCT Pub. No.: WO02/23803

PCT Pub. Date: Mar. 21, 2002

(30) Foreign Application Priority Data

Sep. 18, 2000 (FI) .................................. 20002049

(51) Int. Cl.
*G06F 15/16* (2006.01)
(52) U.S. Cl. ...................... 709/217; 709/246
(58) Field of Classification Search .................. 707/3, 707/101, 100; 709/203, 206, 230, 246, 217–219
See application file for complete search history.

(56) References Cited

U.S. PATENT DOCUMENTS

| 5,428,771 A * | 6/1995 | Daniels et al. ............. 718/101 |
| 5,619,713 A * | 4/1997 | Baum et al. ................ 707/102 |
| 5,974,449 A | 10/1999 | Chang et al. |
| 6,055,538 A * | 4/2000 | Kessenich et al. .......... 707/101 |
| 6,092,114 A * | 7/2000 | Shaffer et al. .............. 709/232 |
| 6,513,035 B1 * | 1/2003 | Tanaka et al. ................ 707/3 |
| 6,549,937 B1 * | 4/2003 | Auerbach et al. ........... 709/206 |
| 6,850,991 B1 * | 2/2005 | Young et al. ................ 709/246 |

OTHER PUBLICATIONS

"Wireless LAN, What is a Wireless LAN", Oct. 22, 1997.*

* cited by examiner

*Primary Examiner*—Bunjob Jaroenchonwanit
*Assistant Examiner*—Julian Chang
(74) *Attorney, Agent, or Firm*—Rolf Fasth; Fasth Law Offices

(57) ABSTRACT

The information delivery system of the invention is connected to one or more communication networks. It comprises an information delivery server comprising information receiving modules for receiving of messages from one or more networks and for converting of those to a form suitable for the information processing unit, an information processing unit, which handles the messages in accordance with their content, fetches the information requested, handles the data and constructs replies to those, information sending modules for sending of the replies to one or several networks and for converting of those to a form suitable for the receiver, a user interface, with which services can be created and maintained in the information delivery server from one or more terminals connected to the information delivery system. The invention also provides a method for delivering information to one or more communication networks and a service product to be used in the information delivery server of the invention. The service product of the invention can be used for creating a service to the information delivery server or for searching or delivering information.

17 Claims, 5 Drawing Sheets

| 1 | Function | Specification | Parameters | Add.information |
| 2 | Function | Specification | Parameters | Add.information |
| 3 | Function | Specification | Parameters | Add.information |
| 4 | Function | Specification | Parameters | Add.information |
| 5 | Function | Specification | Parameters | Add.information |
| . | . | . | . | . |
| . | . | . | . | . |
| . | . | . | . | . |

FIG. 2

| | | | |
|---|---|---|---|
| 1. | fetch_internet | html_code | http://www.example.com/Find?title=(*) |
| 2. | fetch | text | /Title?* |
| 3. | fetch_internet | html_code | http://www.example.com/Title?(=2) |
| 4. | fetch | text | TITLE>*< |
| 5. | fetch | text | */* * votes |
| 6. | if_not_successful | send_error | Movie (=4) no review |
| 7. | send | text | Movie (=4) review exists (=5) |

FIG. 3

INFORMATION DELIVERY SYSTEM, METHOD FOR INFORMATION DELIVERY, SERVICE PRODUCT AND USE OF THE SERVICE PRODUCT

TECHNICAL FIELD

The invention is concerned with an information delivery system, which is connected to one or more communications networks, a method for information delivery into one or more networks, a service product used in the information delivery system and a method for creating a service in an information network.

BACKGROUND AND SUMMARY OF THE INVENTION

Computer networks consist of two or more computers which are connected together. A Local Area Network (or internal network) can consist of computers within a company, whereas a Wide Area Network can cover larger areas, such as several cities or even countries. The networks can be interconnected with cables, fibres and/or radio links.

The internet is an example of an internetworked wide area network. This worldwide network can be used for communication and information delivery and information retrieval. The open and common internet has grown phenomenally during the last few years and a large number of services for large and small user groups have developed on the internet. Major reasons for the rapid growth of the internet is the openness of the network technology and the possibility for almost everybody to produce their own content and services on the network with small resources. Thus, the internet allows also services which have a relatively very small but globally large enough user base.

There are also more closed, specialised networks in the world, such as the networks based mostly on telephone technology that are used by wireless communications devices. An example of this kind of network is the GSM cellular telephone network. Typically, the use of the networks and services on it, such as the Short Message Service (SMS), is limited to the customers of a certain telecom operator.

These specialised networks are used mostly for communications between two people as it is technically cumbersome to build general services on them, and different solutions are needed for the networks of different telecom operators. Because of this, only services for large user groups have been built on these networks, and thus there is no large group of information service producers as that of the internet.

Building a service to a network currently requires writing a traditional service program. Traditional programming is difficult, requires programming skills from the creator, and representing of the program in a certain exact form.

Visual programming systems are also complex and hard to use and are not very well suited for information delivery between networks of very different types. In a visual programming system, the program is created by combining rigid operations in form of graphic elements on the screen. Traditional visual programming systems require e.g. large graphic display devices and are not usable on small limited devices. These systems are used mostly for industrial process modelling applications.

The WO publication 9915959 is an example of this kind of solution, where a user can create multimedia programs in real time with a visual programming system.

Different networks work with differing principles and deliver information in different formats and forms. Communication between computers takes place according to certain rules, which are called protocols and there are many different protocols.

TCP/IP (Transmission Control Protocol/Internet Protocol) is one such protocol and it is widely used on the internet. The IP protocol handles packets of data and determines where to send the packets so that they will reach the correct destination. TCP is a transport protocol which builds a virtual connection between the sender and the receiver. The internet also uses other protocols built on top of the TCP/IP protocol, such as SMTP (Simple Mail Transfer Protocol) for electronic mail, HTTP (Hypertext Transfer Protocol) for transferring web pages and DNS (Domain Name Service) for name and address queries on the network.

In the telephone network, a continuous connection is created on the logical level between the terminals and information is sent as a coded sound signal at a constant rate. There are a few standards for representing data and services have been built on top of the basic network, such as voice call, data call (in the ISDN or GSM network). Typically, the use of the network is charged by connection time.

On the internet, information is transmitted in small packets and at a speed required at a certain moment. There are many ways to present information on top of the basic technology. Typically, the use of the network is charged according to connection time, or amount of information transmitted internationally.

In the GSM Short Message network, information is sent as separate 160-character short messages by using the SMS standard. There is no continuous connection. Typically, the use of the network is charged according to the number of messages sent and the price for a single message can be high.

In Finland, online credit card checks are done via the X.25 network, which is an old networking technology and complex to attach to a modern network. X.25 is a primitive packet network, where the packet layer is used to share resources between several logically continuous telephone-network-like virtual connections.

Delivering information across these different networks is hard because the networks operate in different ways and the information has to be converted into a form (standard) that is suitable for the communications devices on the target network.

Networks can be interconnected with a gateway that converts information into the format required by another network. Automatic conversion works only with similar networks and services.

Because connecting different networks is hard to do, the access to the services of e.g. a GSM network is closed except to some few non-customised services targeted at large user groups, which someone sees as financially profitable to build by using expensive traditional methods.

These problems create needs that are awaiting solutions. Among others, there is a need for a method for delivering and converting information between different networks in a flexible way.

There is also a need for a system for managing an information delivery system that has a large group of information producers and users, like on the internet.

This invention describes an information delivery system which is connected to one or more communications networks. It comprises an information delivery server, which has information receiving modules for receiving messages from one or several networks and for converting that information to a suitable format for an information processing unit, an information processing unit which processes the queries according to their content, fetches the information requested, processes the information and builds replies to the queries, and information sending modules which send the replies to one or more networks and convert them to a format suitable for the receiver. The system also includes a user interface, which allows the creating and maintaining of services on the information delivery server from one or more terminals connected to the information delivery system.

Preferably, a routing module sends the replies to a suitable information sending module connected to a suitable network.

The information processing unit, which processes the queries according to their content, fetches the information requested from one or more networks or databases connected to the server.

According to the method of this invention intended to deliver information to one or more communications networks, queries are received from one or more networks, the queries are converted to a suitable form for further processing, they are processed in accordance with their content, the information requested in them is fetched and processed, replies are build to the queries and the replies are sent to the correct network after they have been converted to a format suitable for that network.

The invention also provides a service product to be used in the information delivery server of the invention. The service product can be used to build services on the information delivery server or to fetch, process or store information.

The following text lists some preferable implementations for the invention.

The operation of a service product can be described as a binary program module which is stored on the server or on the network. The operation program of the service can be presented as a list of selected operations (in some database) or in text form. For service providers it can be presented in a form, where they can add command parameters. For service users it is presented in a ready-to-use form.

The queries are processed with a program, which has been created as a command list in the server, as a list of simple operations. The program is stored into a database on the server or at another location on a connected network.

The service description is stored in a database and its operation program is presented and processed by the system. The service can be modified and/or created for a private and/or public and/or restricted user group by using parameters which are typed into input fields in the service program. The operation of a service can also be described by a binary program module, which is transferred to the information delivery server. The service can also be described by a program stored elsewhere on the network.

An Information delivery service, which is created on the service program, can consist of fetching information from the internet, e.g. fetching of a home page or a news page, or fetching information using some other internet protocol. A service can also fetch information from a database which is on the server or on a network.

The server has a number or an address on the network through which requests can be sent to it when a user wishes to use the services.

Different networks have different ways of finding the information delivery servers address, name or identity and for sending a request. The request can be sent from the GSM network as an SMS message, from an iMode device, from a computer connected to the internet using a www page, of through e-mail.

A major benefit of this invention is that the configuring services on the information delivery server is open to all users. In addition, the invention offers a simple way to create services, e.g. with a programming list interface as described.

The reply can be delayed in some functions by a suitable time to make unauthorised use of borrowed communications devices harder.

In the following, the invention is described with figures which are not meant to restrict the invention.

BRIEF DESCRIPTION OF THE DRAWINGS

FIG. 2 shows the general format of a command list in the information delivery server FIG. 3 shows an example of a service built using the command list format.

DETAILED DESCRIPTION

Figure 1:
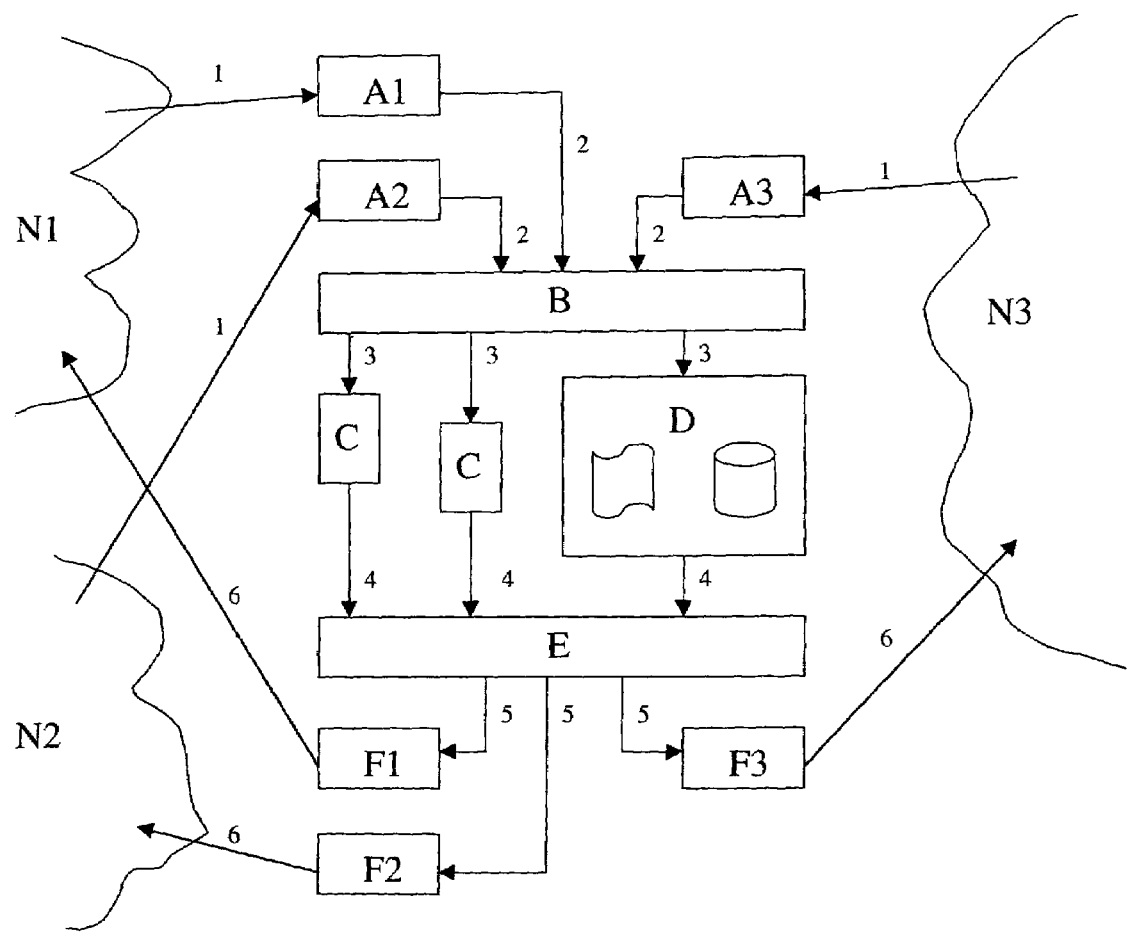
FIG. 1 is a general diagram of an information delivery server described in this invention

The information delivery system of the invention is presented in FIG. 1. The system has information delivery connections 1, through which the system receives 1 requests from the networks N1, N2, N3 and sends (FIGS. 1, 6) replies to those.

The information receiving modules A1, A2, A3 receive 1 information, requests and replies from a certain network N2, N2, N3 and convert the information data to a uniform internal format of the system, so that the later modules in the system would not need to know about different properties of different networks. Such an internal presentation format for data can for example consist of name and value pairs, in which for example the content of the request, the identification data of the sender in the network (for example the telephone number), identity of the sender (if the sender has been identified from the identification data of the network), the information of the arrival time of the request and internal administrational data of the system. There can also be modules, which are technically similar but which are intended for administrationally different networks, for example for networks of different operators.

The information receiving module also identifies, if possible, the user, on the basis of the data given by the network. The information routing module B receives the requests coming to the system and directs 3 them according to the data in the request to a suitable processing module. For example in a GSM SMS network, the first word in the request can identify the service, which is desired to be used. Other networks have own practises for the identification of the service.

If necessary, the information routing module and the processing module further check the identity of the user with some more secure way of identification in the network, for example with a password or a PIN-code.

The information processing modules C process data, fetch data from different networks, modify the format of the data and form replies to the questions. In the following, such a module D is described more in detail but there can be several different modules. One example of a processing module is a general solution that can be programmed by everyone, but there can be other modules, for example more complicated services, etc., which are realised with a different technique than said system. The data sending control module E receives 4 the replies created by the system and sends 5 them to a suitable sending module of the network. Also the information processing module can convert the information data approximately to a form needed by the network. The sending module can then make a more technical conversion on a lower level.

The information sending modules F1, F2, F3 send 6 data, requests and replies to a given network by converting them to a suitable form for the network in question. In some of the networks, the receiving and sending modules can be in one single module.

The administrational modules (not described) take care of the charging, copyright follow up and other collecting, storing, handling and control of data which is required by the system for administration.

The delivery server can work in one centralised server or these functions can be, spread among several servers.

With the user interface, the functional instructions for the service are created, tested and placed for private, limited or public use. The user of the user interface can construct a program by the use of which an own service can be created in the information delivery system.

The service program is such that by feeding given parameters to it, a list of commands are achieved, which are performed in order to carry out the function of the service.

Also such commands can be made in the command list which work conditionally, are transferred to some other place in the command list, or work repeatedly.

The principle of such a command list is presented in FIG. 2. Each element in the command list consists of the command, specifications and parameters as well as of additional information for the command in question. These are presented for the user in form of clear selection menus, so that the user would not need to remember the names of the commands or any special way of presentation of the commands. Each command is a simple individual function, easy to understand.

Examples of such functions are presented below. There can be different functions and types of functions depending on for example the users of the system.

In the third parameter part of all commands, the results of other command lines, as well as the words and data in the request, can be used in a flexible way, for example the words used in the request for fetching data from a www-address can be used as words for the www-service.

The general information processing module of the invention can for example handle following kinds of commands:
Fetching and transferring of data:
Search from Internet; HTML-code; http://www.example.com
Searches the html-code of the www-page from the www-server working at the given address.
Search from Internet; finger-data; username@example.com
Makes a request according to the finger-protocol from internet to the given device.
The finger-data tells for example if the user at that moment sits at the terminal.
Search from Internet; whois-data; example.com
Makes a whois-request from internet according to the given domain-name.
Whois-data contain the situation of the domain (free, occupied) as well as data of the owner of the domain-name.
Send to Internet; e-mail; address and text
Sends an e-mail message to the given e-mail address.
Perform; SSH-remote command; example.com, command
Performs the given command in an other server by using the Secure Shell (ssh)-program for secure data transformation and identification.
Data processing:
Go; to the beginning of the line; how many lines back
Transfers the cursor in the document backwards to the beginning of the line.
Search; forward in the text; text to be found
Finds the given text in the document, by beginning from the position of the cursor.
Select; to the end of the line; how many lines
Transfers the cursor forwards to the end of the line and saves the former place of the cursor and the text between the end of the line as a result of this command.
Change; the letters to capitals; from which text
Changes all letters in the text in the argument to capitals.
Perform; calculation; the equation of the calculation
Performs the calculation given.
Remove from the text; HTML-codes; (no parameters)
Removes the html-code marks from the document (<something>).
Store data; userwise; the name of the data and the data itself
Stores some information userwise in a permanent archive, from where it can be used next time. In such a way the service can save for example the last reply that is easy to repeat.
Search information; servicewise information; the name of the information
Fetches the data stored servicewise, which the service can make use of.
Repeatable operations and conditional functions:
Repetition; collect results and repeat; what place in the program to repeat
Perform a part of the command list again and again by collecting, at each time, the result of the last command as long as the length of the results together can be put in the limited length of the reply. With this function, repeatable information can be fetched from the page so that the reply becomes full.
If the previous command was successful; go to a place in the program; to what place
If the previous function was not successful (for example if the search of the www-page failed, the text to be found was not found) then go to a given place in the command list. By means of these commands, error situations and selection situations can be taken care of.
If the previous function failed; send an error message; The text of the error message
If the function was not successful, the given failed message is sent back to the person who made the request.
Functions for a trusted and limited user group:
Search information; from a data base; the query command of the data base
Performs the given data base request and sets the result of the data base request to be the result of this command line.
Execute the program; in the delivery server; the name of the program
Executes the given program in the delivery server.
Execute the program; Perl-program; the code of the program
Performs the given program given as parameters in perl-language inside the information processing module.

The users can use these functions for controlling of the function of the data delivery server and establish different delivery functions. Such a limited command list system is realized so that there can be many users and services and the maintenance of those is spread among a big user group.

The command list is in other words presented for the user as a list of functions. At each function, there is a function with which the user can remove a function, add a new function before that or after that, move a function to be an earlier function or a later function, and test the functionality of the command list until this function, and other corresponding functions In the user interface, the user can also test the functionality of the command list in different ways, for example by performing the list only to a given stage, or by following the performance of it in the different stages. Hereby, the performing module performs the command to a desired stage, by showing the intermediate results for the user and the end results after the execution.

Also general parameters in connection to the service are set with the user interface, for example it is decided if the service is private, intended for a limited user group or if it is open for everyone.

The storing of the functional data of the service takes place in such a form in the delivery server that the conversion and the performance of those is easy.

The command list can be stored in a data base for example in a form according to FIG. 2.

The command list is presented in the data base of the delivery server in form of simple lines, which are processed by the user interface and the performance module uses these commands in its performance.

The command list can also be presented in text mode for advanced users, for transferring or for printing.

The performing module performs the stored instructions in the delivery server and thus performs the function of the service in practise.

When the routing module of the system has drawn the conclusion that the request should be sent to some certain performance module or processing module, the request is routed and, depending on which service it is question about, the performing module downloads the command list of the service from a data base or some other storage form and performs the functions in them in accordance with the instructions in the command lines.

The performing module also stores the data in connection with the execution, e.g. the result of each command, the information about that if the work of the command was successful or not, possibly the information fetched from an external network, possibly information produced by an external program etc. In such a way the result of earlier performed commands can be used in a flexible way in the command list.

The system also stores data of the users and services for each service for a longer time, whereby the system can "remember" the settings and the data and thereby produce more complicated services in this way. The service does not necessarily, know who the user of the service is, but the system can store data anonymously with respect to the service.

In this way, the execution module can perform the function of the masscustomised service.

In the following there is presented an example of a service form, which has been described exactly to illustrate the invention. It is clear that a lot of different embodiments are possible in the scope of the invention and the claims.

EXAMPLE

Detailed Description of a Solution

It is assumed that a user has created a cinema service "movie" by using the general information processing module with the aim of presenting reviews of movies.

The command list for the general information processing module has been stored in the data base in a form presented in FIG. 3. The command list consists of successive commands, which can have a specification and parameters.

Figure 4:
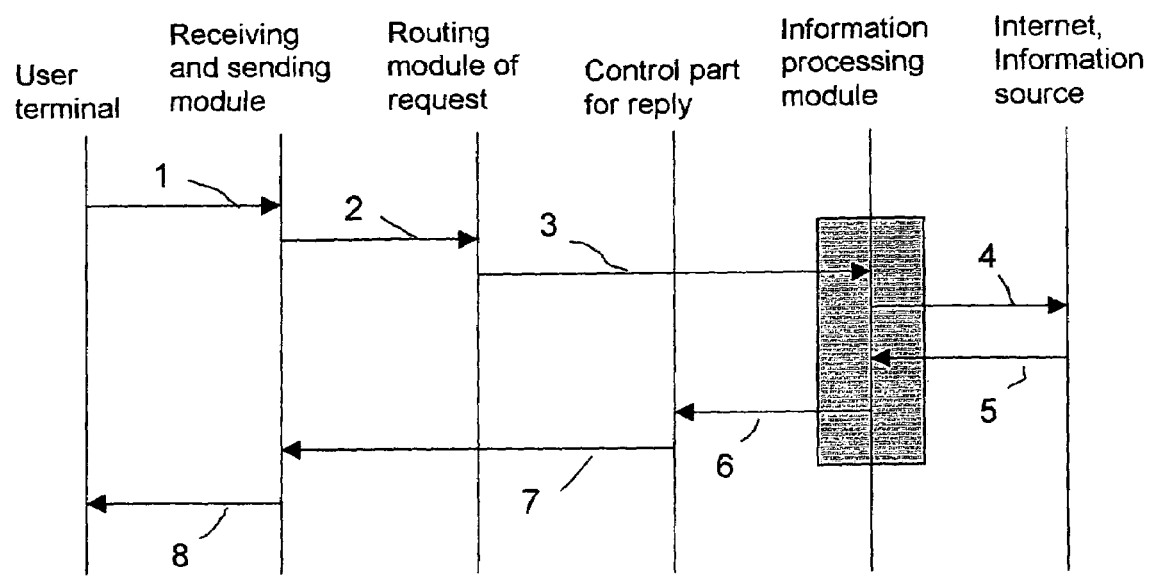
FIG. 4 is a protocol description for using a service built according to this invention

The message running on the system level has been described in FIG. 4. The processing of the message in the information processing module has been described more exactly in FIG. 5. Reference is made to these figures later in the text.

The Request Running on the System Level

It is assumed that a user of the service wants to use this service in the GSM short message network. In the GSM short message network the service is identified according to the first word of the request message. The user whose telephone number of the mobile phone is 0123456, sends (FIG. 4: arrow 1) a message from his terminal

MOVIE STAR WARS to the short message number 1234 of the information delivery server.

The request comes to the information receiving module for short messages of the GSM network in question controlled by the short message number.

The data receiving module converts the request in a form suitable for the internal system, which is common for the different networks.

One practical internal presentation form for the data is such that the request is presented in a flexible way as a list of name-value pairs, whereby the data is clearly divided, but the number of data pairs has not been restricted in forehand, whereby the system can quickly fit to new network connections.

The receiving module would convert the received message MOVIE STAR WARS into the following form (name=value):

REQUEST=MOVIE STAR WARS
KEY WORD=MOVIE
NUMBER OF WORDS IN THE REQUEST=2
THE FIRST WORD OF THE REQUEST=STAR
THE SECOND WORD OF THE REQUEST=WARS
ALL THE WORDS IN THE REQUEST=STAR WARS
SENDER=01234567
THE OPERATOR OF THE SENDER=gsmoperator
RECEIVER=01234567
THE TELEPHONE NUMBER OF THE SERVICE=01234
THE ARRIVAL TIME OF THE REQUEST=11.9.2000 12:34:56
TYPE OF REQUEST=GSM SMS Then the receiving module of the message transfers the request in this standard internal presentation form to the data routing part (FIG. 4: arrow 2). The routing part of the message knows, on the basis of the key word, which of the information processing module is able to take care of this service request. In this case, it can be found in the service list of the routing part, that the film service is performed with the general information processing module. Therefore, the routing part transfers the request further to the general information processing module (FIG. 4: arrow 3).

The general information processing module receives the request still in the internal form. It looks after the command list corresponding to the key word MOVIE in its own command list, downloads that and begins to perform the commands in the list in the right order.

It can for example be question about searching information from internet (FIG. 4, arrows 4, 5). This function has been described more in detail below at "request running in the information processing module" and in FIG. 5 in detail. When the information processing module has performed the command list so far that the command now is to send the reply, it adds the reply message to the name-value list of the internal presentation form of the request:

REPLY=Movie STAR WARS (1977) review 8.4/10 (12345 votes) and transfers the request further to the control module for the reply (FIG. 4, arrow 6).

When the receiving module for the reply receives the message, it sends the internal presentation form of the request further with all the information to the sending module corresponding to the operator of the sender (FIG. 4, arrow 7). In some situations, it is preferable to send the reply through some other operator network, whereby the control module can forward the message to the information sending module of this other network.

When the information sending module gets the request, it sends the reply to the operator network in question, to the telephone number of the receiver (FIG. 4: arrow 8). In this way the user finally gets its answer to the request. In our prototype system, the route of the request from user to user takes a few seconds, in other words the service works quickly.

The Request Running in the Information Processing Module in Detail

Figure 5:
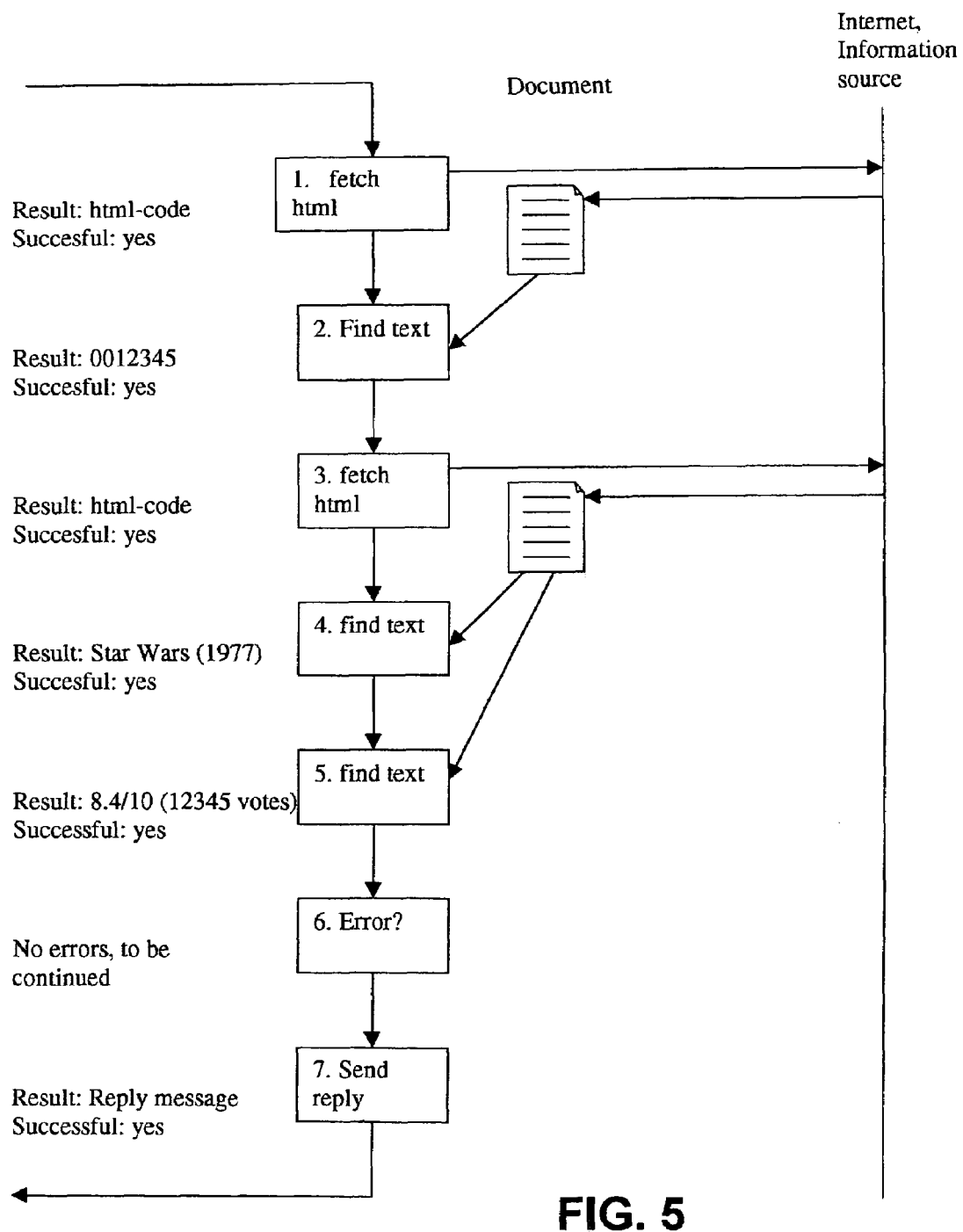
FIG. 5 shows a detailed protocol flow for executing a service command list

In the following there is described more in detail how the general information processing module handles the information (FIG. 4: arrows 3–6, FIG. 5).

The general information processing module performs said commands in the command list in order. The system has also commands with which it is possible to go to some other command than to the following one, repeat some of the commands or conditionally depending on if a command was successful or not.

Each command line is performed in the following way:

The parameters of the command are handled so that if words have been desired to be put in some special places, for example as a result of the request or as a result of some other command, the texts in question are replaced in the desired places of the parameter. In this way the function of the command can be parameterised by the sender of the request.

The control is transferred to the module processing the command in question in the information processing module, which performs the function to which the command corresponds.

Each command sets the following data as its result, which is stored to be used by later commands:

Document: If information was fetched, the data in question is set as a document

Cursor: In which place of the document we are, if the position of the cursor was changed Result: If data was searched or fetched, the data in question is set as a result of the command Was it successful: The information about that if the command was successful or not The document contains a bigger amount of text which is maintained from one command to another, if the command to search information does not alter the content of the document. The search functions are directed to the content of the document. The cursor tells at which place of the document we are after each operation.

When the above mentioned request MOVIE STAR WARS appears in the information processing module and the command list of FIG. 3 is in use, the system works in the following way:

| fetch_internet | html_code | http://www.webaddress/Find?title=(*) |

First the definition (*) in the parameter is extended to mean all words in the request in addition to the key word. Then the www-page, which address has been given, is fetched from internet. The html-code of the page in question remains as a document after that the command has been performed.

A user, that has built up a service in a way according to the invention, has figured out that the data of the movie can be found from such an internet-address as a www-page and has therefore placed such a command in the command list.

The system also stores the information about that that the page was searched from the www.webaddress server so that the data later can be added to the end of the message as a source reference.

| fetch | text | /Title?* |

This command fetches the text given in the document. It is possible to use * and ? wildcards in the text of which * means any words/text and ? any single letter. As there is a place in the search document which reads <L1><A HREF="/Title?0012345">Star Wars (1977)</A><BR> . . .

it means that the search is successful and the result of the command is the text at *, in other words "0012345". The cursor remains in the end of the found text for further operations, in this case after the number series before the "-mark.

| fetch_internet | html_code | http://www.webaddress/Title?(=2) |

In this case, the constructor of the service has, when creating the service, noticed that, in the search there will first come a page which has links to the movie pages themselves and another page with detailed information of the movie has to be fetched from the network. Therefore, another www-page is fetched in the command by using the text found in command 2 in the address.

In the parameter, the mark (=2) means the result of command 2, so it extends to the form http://www.webaddress/Title?0012345 page to be fetched from www. As a result of the command, the address of the new www-page becomes the content of the document. Every time the content of document is completely changed, the cursor is placed in the beginning of the document.

| 4 | fetch | text | TITLE>*< |

In the following, the title of the page is searched from the page, in which there is the exact name of the movie mentioned. In command 3, the html-code of the searched page is the place
<TITLE>Star Wars (1977)<TITLE>
which is the place, wherein the function can find the name of the movie. The function of the special function * is constructed so that it works in the expected way in such cases (e.g. '*' matches a small number of white space characters in addition of ordinary letters). The cursor remains at the end of the found text. Then the text at * becomes the result of the command, in other words "Star Wars (1977)".

| 5 | fetch | text | */* * votes |

The review of the movie, which is searched in this command, is in this case in the form
. . . 8.4/10 (12345 votes).
on the www-page. As * fits to several characters or a few words, the command "find text" finds the desired place from the document and the value "true" is presented to illustrate that the search was successful. The text found becomes the value of the command, in other words "8.4/10 (12345 votes)".

| 6 | if_not_succeeded | send_error | Movie(=4) no review |

If the previous command, in which the review was searched, did not succeed (in other words the www-page did not have any review), an error message is sent to the user. In this case the command "find text" was successful why the error message is not sent, but the execution of the program continues from the following command. If the error message would be sent, the execution of the command list would end at the same time.

| 7 | send | text | Review of (=4) film is (=5) |

Finally, the content of the reply message is built up in a clear form by combining the results. The parameter (=4) is replaced with the result of the fourth command and the parameter (=5) with the result of the fifth command, so that the parameter in this case becomes the text
Review of movie Star Wars (1977) is 8.4/10 (12345 votes)
which the information processing module sends further to the reply control part to be sent to the sender of the request.

While the present invention has been described in accordance with preferred compositions and embodiments, it is to be understood that certain substitutions and alterations may be made thereto without departing from the spirit and scope of the following claims.

I claim:

1. An information delivery system that is connected to communication networks, comprising:
an information receiving module in communication with a plurality of communication networks, the information receiving module is for receiving a message from a sender in communication with a first communication network and for converting the message into a form suited for information processing units in communication with the information receiving module;
detection means for detecting and distinguishing a first keyword from requested information in a first request of the converted message;
an information routing module in communication with the information receiving module, the information routing module receiving the converted message and using the first keyword for selecting a first information processing unit and using a second keyword for selecting a second information processing unit, the second keyword being different from the first keyword and the second information processing unit being different from the first information processing unit, the information routing module having directing means for selecting and directing the converted message to the first information processing unit based on first keyword received from the sender;
the first information processing unit having a database with a first command list;
the first information processing unit using the first keyword to identify the first command list;
the second information processing unit using the second keyword to identify a second command list;
means for downloading the first and second command lists;
first processing means for performing commands listed in the downloaded first command list associated with the first keyword;
second processing means for performing commands listed in the downloaded second command list associated with the second keyword;
sending means for sending a reply with results of the performed commands;
an information sending module in communication with the first and second information processing units for converting the reply to a form suited for a receiver of the reply, the receiver being the sender or the receiver being in communication with a second communication network; and
a user interface in communication with an information delivery server, the user interface having a terminal connected to the information delivery system for creating and maintaining a service product in the information delivery system.

2. The information delivery system according to claim 1 wherein the information sending module is in communication with an information control module for receiving an answer therefrom for sending the reply via a sending module to the receiver of the reply.

3. The information delivery system according to claim 1 wherein the first information processing unit is in communication with a plurality of networks and is adapted to fetch information requested in the message, from the plurality of networks or databases stored in the information delivery server.

4. The information delivery system according to claim 1 wherein the first information processing unit is adapted to handle the message and the information requested by means of a service product that has a command list program comprising a list of functions.

5. The information delivery system according to claim 4 wherein the command list program is stored a database of the information delivery server.

6. The information delivery system according to claim 1 wherein the first communication network is a wireless communication network.

7. A method of delivering information to communication networks, comprising:
   providing a service product for fetching, processing or storing information;
   presenting an operation program of the service product as a first command list and a second command list of functions to be performed;
   associating the first command list with a first keyword and the second command list with a second keyword;
   storing the first command list and the second command list in a database;
   receiving a first message comprising the first keyword from a first communication network;
   detecting and distinguishing the first keyword from requested information in the first message;
   using the first keyword to select a first information processing unit;
   using the second keyword to select a second information processing unit;
   using the first keyword to select for the first command list in the first information processing unit;
   using the second keyword to select for the second command list in the second information processing unit;
   finding and retrieving the first command list;
   performing functions of the first command list;
   fetching information requested in the first message;
   preparing a first reply based on the fetched information;
   converting the first reply to a first form suited for the first communication network when the first reply is sent to the first communication network and converting the first reply to a second form suited for a second communication network when the first reply is sent to the second communication network; and
   sending the first reply to the first communication network or to the second communication network.

8. The method according to claim 7 wherein the method further comprises fetching information requested in the first message from a plurality of networks or from a database stored in an information delivery server.

9. The method according to claim 8 wherein the method further comprising processing the first message and fetching the information requested by means of a the service product, including simple functions in a command list program, created in the information delivery system.

10. The method according to claim 7 wherein the method further comprises storing an information delivery product, comprising the information requested, in the database.

11. The method according to claim 10 wherein the method further comprises modifying the information delivery product with parameters added to fields of an information delivery product program.

12. The method according to claim 10 wherein the method further comprises describing a function of the information delivery product with a binary program module and transferring the binary program module to an information delivery system.

13. The method according to claim 7 wherein the method further comprises describing a function of an information delivery product with a program stored in the first communication network.

14. The method according to claim 7 wherein the method further comprises storing data from a set of information delivery products in an information delivery server.

15. The method according to claim 7 wherein the method further comprises storing data about a user, the data excluding identification data of the user.

16. The method according to claim 7 wherein the method further comprises constructing an information delivery product to conform to a mediated information and to prevent access to predetermined data in the first communication network.

17. The method according to claim 7 wherein the method further comprises delaying the first reply prior to sending the first reply.

* * * * *